US011902130B2

(12) United States Patent
Scott et al.

(10) Patent No.: US 11,902,130 B2
(45) Date of Patent: Feb. 13, 2024

(54) DATA PACKET LOSS DETECTION

(71) Applicant: SERVICENOW, INC., Santa Clara, CA (US)

(72) Inventors: Justin William Scott, Snohomish, WA (US); Adrian Pirciu, Hoffddorp (NL)

(73) Assignee: SERVICENOW, INC., Santa Clara, CA (US)

( * ) Notice: Subject to any disclaimer, the term of this patent is extended or adjusted under 35 U.S.C. 154(b) by 90 days.

(21) Appl. No.: 17/353,335

(22) Filed: Jun. 21, 2021

(65) Prior Publication Data

US 2021/0314246 A1 Oct. 7, 2021

Related U.S. Application Data

(63) Continuation of application No. 16/424,196, filed on May 28, 2019, now Pat. No. 11,044,184.

(51) Int. Cl.
| | | |
|---|---|---|
| *H04L 12/26* | (2006.01) | |
| *H04L 1/20* | (2006.01) | |
| *H04L 12/823* | (2013.01) | |
| *H04L 29/06* | (2006.01) | |
| *H04L 29/08* | (2006.01) | |
| *H04L 43/0829* | (2022.01) | |
| *H04L 69/16* | (2022.01) | |
| *H04L 47/32* | (2022.01) | |
| *H04L 67/10* | (2022.01) | |

(52) U.S. Cl.
CPC .......... *H04L 43/0829* (2013.01); *H04L 1/20* (2013.01); *H04L 47/32* (2013.01); *H04L 67/10* (2013.01); *H04L 69/16* (2013.01)

(58) Field of Classification Search
CPC .............. H04L 1/1642; H04L 43/0835; H04L 67/1095; H04L 47/32; H04L 69/16; H04L 67/10; H04L 43/045; H04L 43/0829; H04L 1/08; H04L 1/20; H04L 47/12
See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |

(Continued)

*Primary Examiner* — Maharishi V Khirodhar
*Assistant Examiner* — Kenneth P Hunt
(74) *Attorney, Agent, or Firm* — Fletcher Yoder, PC

(57) ABSTRACT

The representative embodiments discussed in the present disclosure relate to techniques with which data packet loss, such as Transmission Control Protocol (TCP) packet loss, may be detected. More specifically, in some embodiments, by detecting a TCP packet with an enabled selective acknowledgement (SACK) signal, the loss (e.g., drop) of an additional TCP packet may be determined. Moreover, using information included in the detected TCP packet, an operational efficiency of a cloud computing system and/or a component of the cloud computing system may be determined.

20 Claims, 7 Drawing Sheets

(56) References Cited

U.S. PATENT DOCUMENTS

| | | |
|---|---|---|
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | Peuter |
| 8,832,652 B2 | 9/2014 | Mueller |
| 8,887,133 B2 | 11/2014 | Behnia |
| 9,098,322 B2 | 8/2015 | Apte |
| 9,239,857 B2 | 1/2016 | Trinon |
| 9,317,327 B2 | 4/2016 | Apte |
| 9,363,252 B2 | 6/2016 | Meuller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 11,044,184 B2 * | 6/2021 | Scott ................... H04L 1/20 |
| 2012/0198346 A1 * | 8/2012 | Clemm ............. H04L 43/0817 |
| | | 715/736 |
| 2014/0064119 A1 * | 3/2014 | Iizuka ............... H04L 43/0829 |
| | | 370/252 |
| 2014/0122650 A1 | 5/2014 | Lim et al. |
| 2015/0319064 A1 * | 11/2015 | Oishi ................. H04L 43/0829 |
| | | 370/241.1 |
| 2016/0359681 A1 * | 12/2016 | McGleenon ........... H04L 41/12 |
| 2017/0346931 A1 * | 11/2017 | Vyas ................... H04W 76/20 |
| 2018/0145879 A1 * | 5/2018 | Cook ................. H04L 41/122 |

\* cited by examiner

DATA PACKET LOSS DETECTION

CROSS-REFERENCE TO RELATED APPLICATIONS

This application is a continuation of and claims priority to U.S. patent application Ser. No. 16/424,196, entitled "DATA PACKET LOSS DETECTION," filed on May 28, 2019, which is herein incorporated by reference.

BACKGROUND

The present disclosure relates generally to data packet loss detection, such as Transmission Control Protocol (TCP) packet loss detection.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

As part of communicating in such a cloud-based environment, systems and/or devices in a communication network may use communication protocols, such as Transmission Control Protocol (TCP), to transmit and receive data packets to one another. For instance, to communicate certain information, a first device in the communication network may be implemented to send a sequence of TCP packets to a second device in the communication network, which may be implemented to receive the sequence. In some embodiments, however, one or more of the sequence of TCP packets may be dropped (e.g., lost and/or corrupted) during transmission from the first device to the second device. In such cases, the second device may receive an incomplete sequence of TCP packets and/or may receive incomplete data, which may prevent the second device from performing an action based on the sequence of TCP packets. Accordingly, the loss of TCP packets during data communication between end hosts communicating over a network, such as the first and second device, may degrade the operational efficiency of the IT infrastructure solution, such as a cloud computing infrastructure.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some embodiments, after one or more of a sequence of TCP packets are dropped during communication between two or more end hosts in a network, the dropped one or more TCP packets may be re-transmitted. More specifically, the receiver of the incomplete sequence of TCP packets may send a new TCP packet that has an enabled acknowledgement signal (e.g., flag), such as an enabled selective acknowledgment signal (SACK), to the original sender of the sequence of TCP packets. The enabled selective acknowledgement signal may indicate the presence of a gap and/or missing information from the received sequence of TCP packets. Accordingly, in response to receiving the enabled selective acknowledgement signal, the original sender of the sequence of TCP packets may re-transmit one or more of the sequence of TCP packets. For example, in some embodiments, the original sender of the sequence of TCP packets may resend each of the sequence of TCP packets. Additionally or alternatively, the original sender of the sequence of TCP packets may re-transmit only the one or more dropped TCP packets.

Accordingly, identifying TCP packets with enabled selective acknowledgement signals may provide useful information to diagnose and/or prevent communication issues within a communication network, such as a cloud computing system. More specifically, as described in greater detail below, trends in communication issues between two systems, such as a host device (e.g., host computing device) and/or a network, an operational status of a device included in the communication network, an efficiency of an external network, and/or the like may be determined based at least in part on information associated with a TCP packet having an enabled selective acknowledgement signal, which may correspond to one or more dropped TCP packets. To that end, the cloud computing system may include certain circuitry (e.g., devices) and/or logic to collect and/or analyze the TCP packet communication within the cloud computing system.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As discussed in further detail below, embodiments of the present disclosure relate generally to techniques with which data packet loss may be detected. More specifically, the present disclosure relates to detecting a Transmission Control Packet (TCP) packet with an enabled selective acknowledgement (SACK) signal, to determine the loss (e.g., drop) of an additional TCP packet. Moreover, using information in the detected TCP packet, an operational efficiency of a cloud computing system and/or a component of a cloud computing system may be determined and/or monitored. Further, while the embodiments described herein relate to TCP packets, and more specifically, to TCP packets with enabled selective acknowledgement signals, any suitable data packets that include any suitable data fields may be used. Thus, embodiments described herein are intended to be illustrative and not limiting.

Figure 1:
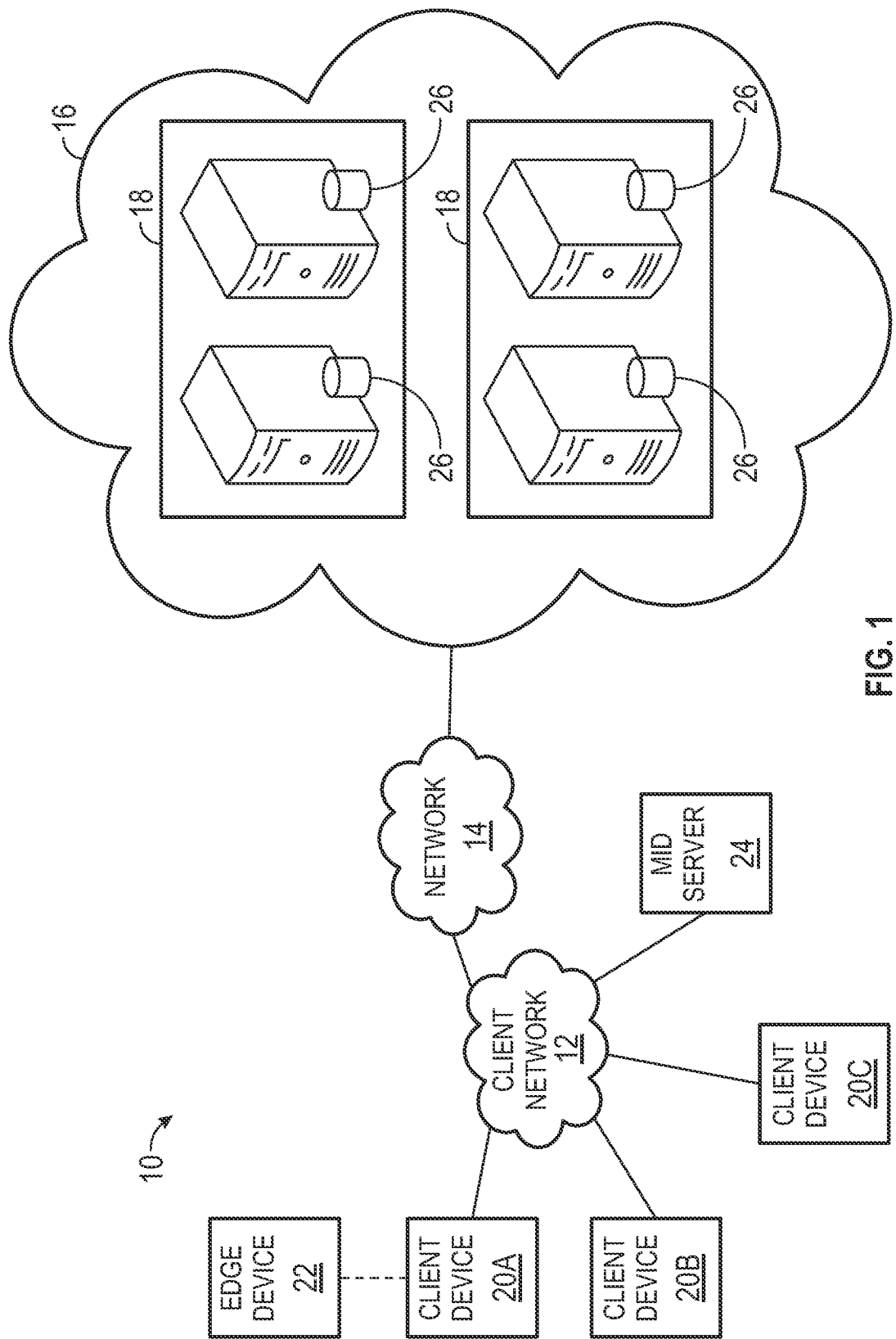
FIG. 1 is a block diagram of an embodiment of a cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
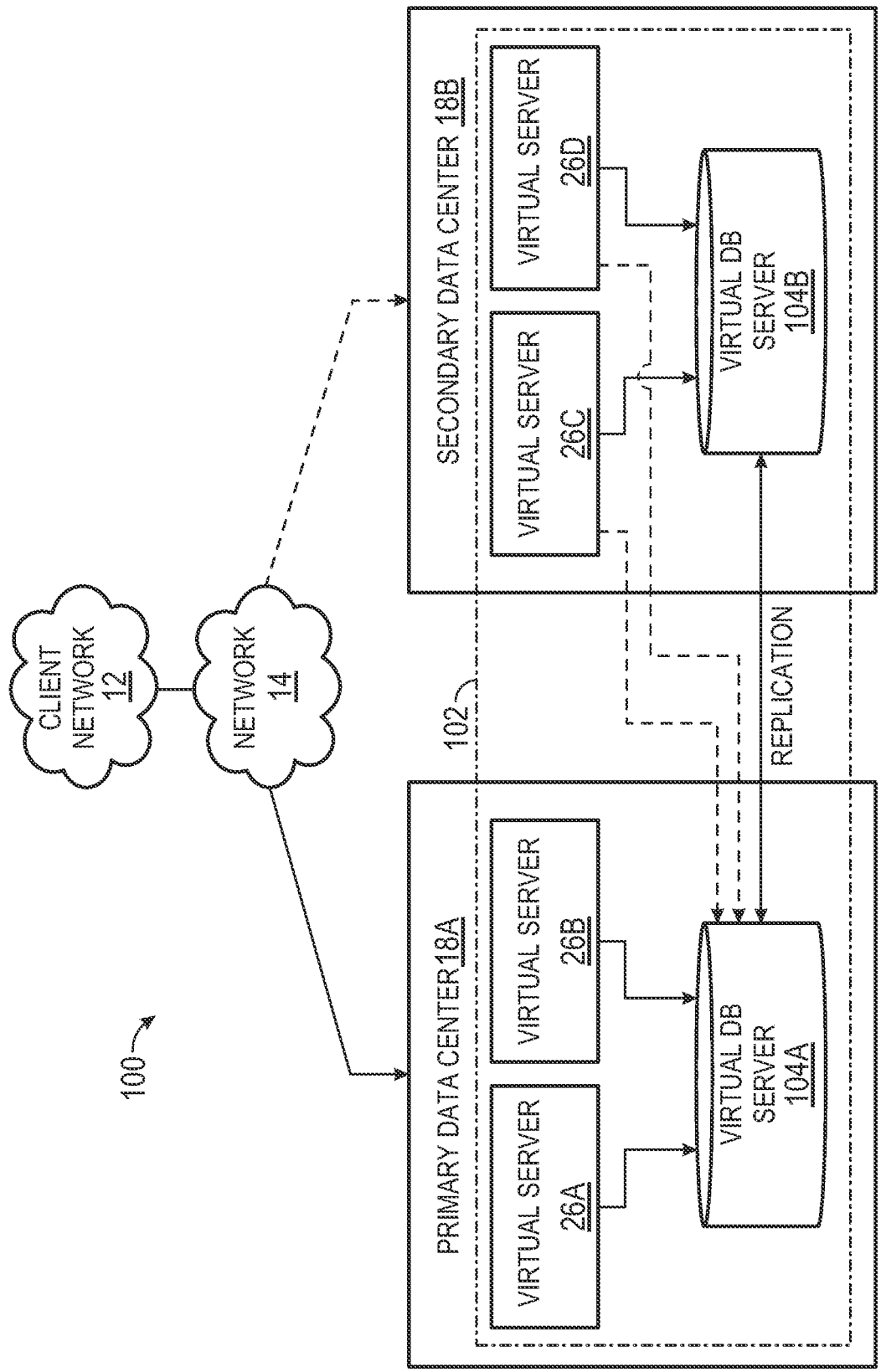
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
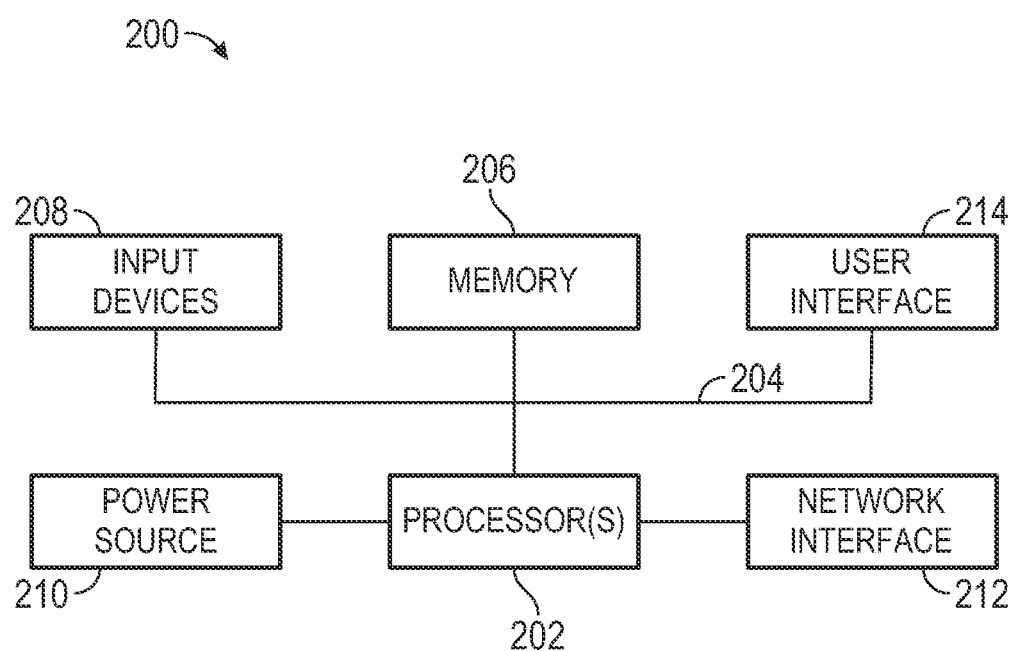
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

As discussed above, in some embodiments, the network 14 may employ any number of network communication protocols, such as Transmission Control Protocol (TCP). Accordingly, to communicate over the network 14, the network hosting the platform 16 and/or the devices connected to the client network 12, such as the client devices 20A, 20B, and 20C and/or the edge device 22, may be implemented to communicate according to the network communication protocol employed by the network 14. More specifically, to facilitate communication between a client device 20A and the network hosting the platform 16 via TCP, the client device 20A and the network hosting the platform 16 may be implemented to send and receive a number of TCP packets, which may each include a set of data fields. For instance, the client device 20A may transmit a sequence of TCP packets to the network hosting the platform 16 to communicate certain information to the network hosting the platform 16. In some embodiments, however, one or more of the sequence of TCP packets may be dropped (e.g., lost and/or corrupted) during transmission to the network hosting platform 16. In such cases, the network hosting the platform 16 may receive an incomplete sequence of TCP packets and/or may receive incomplete data, which may prevent the network hosting the platform 16 and/or an additional computing system 200 from performing an action based on the sequence of TCP packets. Accordingly, the loss of TCP packets during data communication between end hosts communicating over a network, such as the client device 20 and a virtual server 26 included in the network hosting the platform 16, may degrade the operational efficiency of the cloud computing system 10.

Further, in some embodiments, after the one or more of the sequence of TCP packets are dropped, the receiver of the incomplete sequence of TCP packets (e.g., the network hosting the platform 16) may send a new TCP packet that has an enabled acknowledgement signal (e.g., flag), such as an enabled selective acknowledgment signal (SACK), to the original sender of the sequence of TCP packets (e.g., the client device 20A). As described herein, a "retransmission request TCP packet" refers to the new TCP packet sent with an enabled acknowledgment signal to the original sender of a sequence of TCP packets having a dropped TCP packet. The enabled selective acknowledgement signal of the retransmission request TCP packet may indicate the presence of a gap and/or missing information from the sequence of TCP packets. Accordingly, in response to receiving a retransmission request TCP packet, the original sender of the sequence of TCP packets (e.g., the client device 20A) may re-transmit one or more of the sequence of TCP packets. For example, in some embodiments, the original sender of the sequence of TCP packets may resend each of the sequence of TCP packets. Additionally or alternatively, the original sender of the sequence of TCP packets may re-transmit only the one or more dropped TCP packets.

Accordingly, identifying retransmission request TCP packets may provide useful information to diagnose and/or prevent communication issues within the cloud computing system 10. Thus, in some embodiments, the network hosting the platform 16 may include a number of data collection points associated with a tap aggregation device. The data collection points may be located at the ingress and/or egress of the data centers 18, such as at a WAN link between data centers 18, a peering link to the network 14, and/or the like. Additionally or alternatively, the data collection points may be disposed at and/or within a load balancer communicatively coupled to the virtual servers 26 and/or the data centers 80. Further, while particular data collection point locations are described herein, any suitable location in the cloud computing system 10 may include a data collection point. Thus, embodiments described herein are intended to be illustrative and not limiting.

Further, the data collection points may be located and/or communicatively coupled to an optical fiber connection, such as a network connection between a set of routers. Moreover, the data collection points may include one or more optical taps (e.g., an optical prism, an optical splitter, and/or the like) that may be implemented to route data to one or more data paths. To that end, the optical taps may be implemented to forward data communication traffic (e.g., TCP packets) to the tap aggregation device. In some embodiments, for example, the optical taps may also be implemented to copy (e.g., split) the data communication traffic such that a first copy of the data communication traffic packet continues on an original data path (e.g., remains uninterrupted), while a second copy of the data communication traffic is routed to the tap aggregation device. In other embodiments, the optical taps may be implemented to route all data communication traffic to the tap aggregation device without copying the data communication traffic such that the tap aggregation device may control the data path of the data communication traffic.

The tap aggregation device may be a network device (e.g., a computing device) in the cloud computing system 10 that is implemented to match (e.g., filter) data, such as a TCP packet, having a predefined characteristic or set of characteristics, such as an internet protocol (IP) source address, an IP destination address, a selective acknowledgement signal state, and/or the like. Accordingly, in some embodiments, the tap aggregation device may be implemented to identify retransmission request TCP packets. For example, after receiving TCP packets routed from the data collection point (e.g., from the one or more optical taps), the tap aggregation device may identify retransmission request TCP packets from among the received TCP packets based on the state of the respective selective acknowledgment signal of the TCP packets. In some embodiments, the tap aggregation device may take no action with (e.g., drop and/or discard) the TCP packets that have a selective acknowledgement signal in a disabled state. Further, the tap aggregation device may route the identified retransmission request TCP packets to an analysis engine of the network hosting the platform 16, such as a virtual server 26 and/or a computing system 200.

In some embodiments, the tap aggregation device and/or the analysis engine may receive duplicate retransmission request TCP packets. For instance, because the cloud computing system 10 and/or the network hosting the platform 16 may be implemented with multiple data collection points, multiple tap aggregation devices, and/or multiple analysis engines, the same retransmission request TCP packet may be identified at multiple different locations in a data path. As an illustrative example, a first optical tap located at a first data collection point at a data center 18 may forward a retransmission request TCP packet received at the data center 18 to a particular tap aggregation device, and a second optical tap located at a load balancer may forward the same retransmission request TCP packet to the particular tap aggregation device. Additionally or alternatively, the same retransmission request TCP packet may be repeatedly re-transmitted. For example, as described above, after a first computing system 200 determines a TCP packet of a sequence of TCP packets transmitted to the first computing system 200 from a second computing system 200 is lost and/or dropped, the first computing system 200 may transmit a retransmission request TCP packet to the second computing system 200. Moreover, the first computing system 200 may continue to transmit the retransmission request TCP packet to the second computing system 200 on a regular periodic interval (e.g., every millisecond (ms), every 5 ms, every 10 ms, and/or the like) until the first computing system 200 receives the lost and/or dropped TCP packet and/or until the first computing system 200 receives an acknowledgement from the second computing system 200.

Accordingly, in some embodiments, to avoid duplicate data associated with the same retransmission request TCP packet, the tap aggregation device and/or the analysis engine may be implemented to uniquely identify a retransmission request TCP packet and/or a TCP packet. For instance, in some embodiments, the tap aggregation device and/or the analysis engine may determine a value of a particular data field included in the retransmission request TCP packet, such as an IP identification field and/or one or more IP header characteristics, to identify a retransmission request TCP packet. Additionally or alternatively, the tap aggregation device and/or the analysis engine may hash one or more data fields included in the retransmission request TCP packet to generate a hash ID (e.g., a fingerprint) that uniquely identifies the retransmission request TCP packet. Moreover, in some embodiments, the tap aggregation device and/or the analysis engine may use data fields within the retransmission request TCP packet that may remain static throughout the cloud computing system 10 to identify the retransmission request TCP packet. That is, for example, the tap aggregation device and/or the analysis engine may use one or more data fields that will remain unchanged as the retransmission request TCP packet is transmitted from the client network 12 to the network 14 and/or the network hosting the platform 16 and vice versa. Further, by uniquely identifying each retransmission request TCP packet, the tap aggregation device and/or the analysis engine may determine whether or not a retransmission request TCP packet is a duplicate. For instance, in some embodiments, the tap aggregation device and/or the analysis engine may compare the retransmission request TCP packet to previously identified retransmission request TCP packets to determine whether the retransmission request TCP packet is a duplicate. If the retransmission request TCP packet is a duplicate, the tap aggregation device and/or the analysis engine may disregard the duplicate packet.

Further, as the volume of TCP packets communicated within the cloud computing system 10 increases, analysis of the TCP packets, as described in greater detail below, may become increasingly computationally intensive. Accordingly, in some embodiments, the tap aggregation device may be implemented to route a subset of the retransmission request TCP packets to the analysis engine. Additionally or alternatively, the analysis engine may analyze a subset of the retransmission request TCP packets routed from the tap aggregation device. To that end, in some embodiments, information related to TCP packets that are not sampled and/or nanalyzed may be extrapolated and/or interpolated based on the TCP packets that are sampled and/or analyzed.

Figure 4:
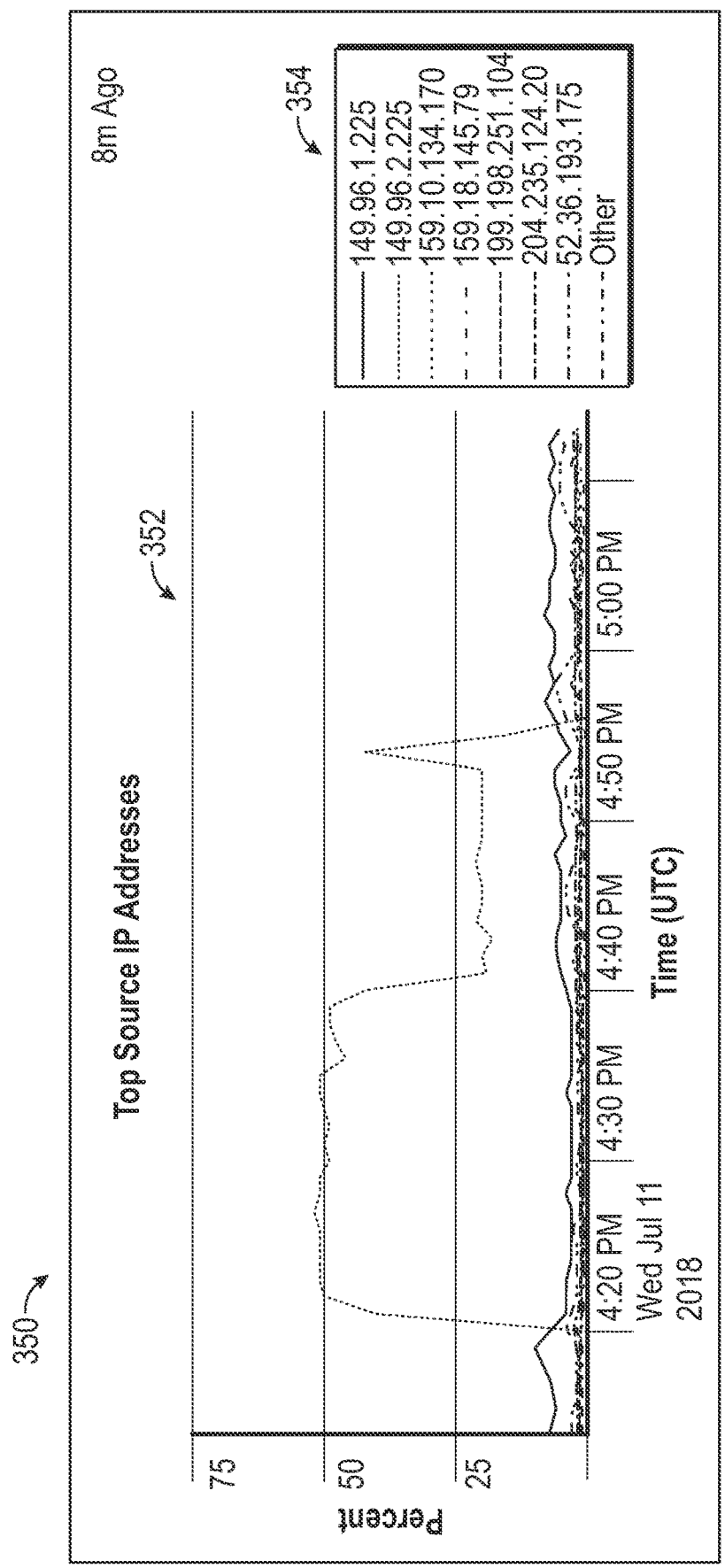
FIG. 4 is an embodiment of a timeline displaying a plot of success rates of Transmission Control Protocol (TCP) packet transmission from a source, in accordance with an embodiment.

With the foregoing in mind, FIG. 4 illustrates an embodiment of a timeline 350 (which may be displayed as a user interface or portion of a user interface) that may be generated based at least in part on retransmission request TCP packets. In some embodiments, for example, the analysis engine may be implemented to analyze retransmission request TCP packets, which, as described herein, may be identified based in part on the state of their respective selective acknowledgment signal. Moreover, the analysis engine may produce the timeline 350 based on identified retransmission request TCP packets. For instance, the retransmission request TCP packets may include a number of data fields, such as a source and/or destination TCP port, a source and/or destination internet protocol (IP) address, a source and/or destination media access control (MAC) address, an IP time to live (TTL) data field, an identification number (IPID), an acknowledgement field (TCP ACK), a TCP sequence number, left and/or right edges in the TCP SACK field, and/or the like. Accordingly, using the information included in and/or associated with retransmission request TCP packets, the analysis engine may produce a plot 352 illustrating historical data associated with a communication host and/or a network (e.g., client network 12, network 14, the network hosting the platform 16, and/or the like) in the timeline 350.

As illustrated, in some embodiments, the plot 352 may illustrate the number and/or percentage of TCP packets associated with (e.g., received and/or originating from) a particular source, such as a particular communication host and/or network, that are dropped. That is, for example, the plot 352 may illustrate how lossy communication from a source and/or between the source and a destination is determined to be. In some embodiments, the source may be identified by an identifier 354 associated with the host, such as an internet protocol (IP) address, a media access control (MAC) address, a port number, and/or the like, which may be included in the TCP packets transmitted by the source. Moreover, the identifier 354 may be included in retransmission request TCP packets transmitted from a destination associated with the source to the source when a TCP packet sent from the source to the destination is dropped. Accordingly, to generate the plot 352, the analysis engine may receive a number of retransmission request TCP packets from one or more destinations and may determine a respective source associated with each of the retransmission request TCP packets. Further, the analysis engine may maintain a history of the retransmission request TCP packets associated with a particular source so that trends associated with the performance of source may be illustrated and/or analyzed in, for example, the plot 352.

Further, in some embodiments, the analysis engine may be implemented to capture TCP setup data fields (e.g., synchronize (SYN), synchronize acknowledge (SYN-ACK), and/or the like) and/or TCP teardown data fields (e.g., reset (RST), FIN, and/or the like) from retransmission request TCP packets. In such embodiments, the number of bytes and/or packets originally sent by a host may, whether or not any of the data is dropped, be determined based in part on the TCP setup and/or the TCP teardown data fields. Accordingly, using the total number of bytes and/or packets sent by a host and the number of packets dropped by the host (e.g., requested to be re-transmitted by the host), the percentage of packet loss between a source and a destination may be determined and/or illustrated, such as via the plot 352.

Figure 5:
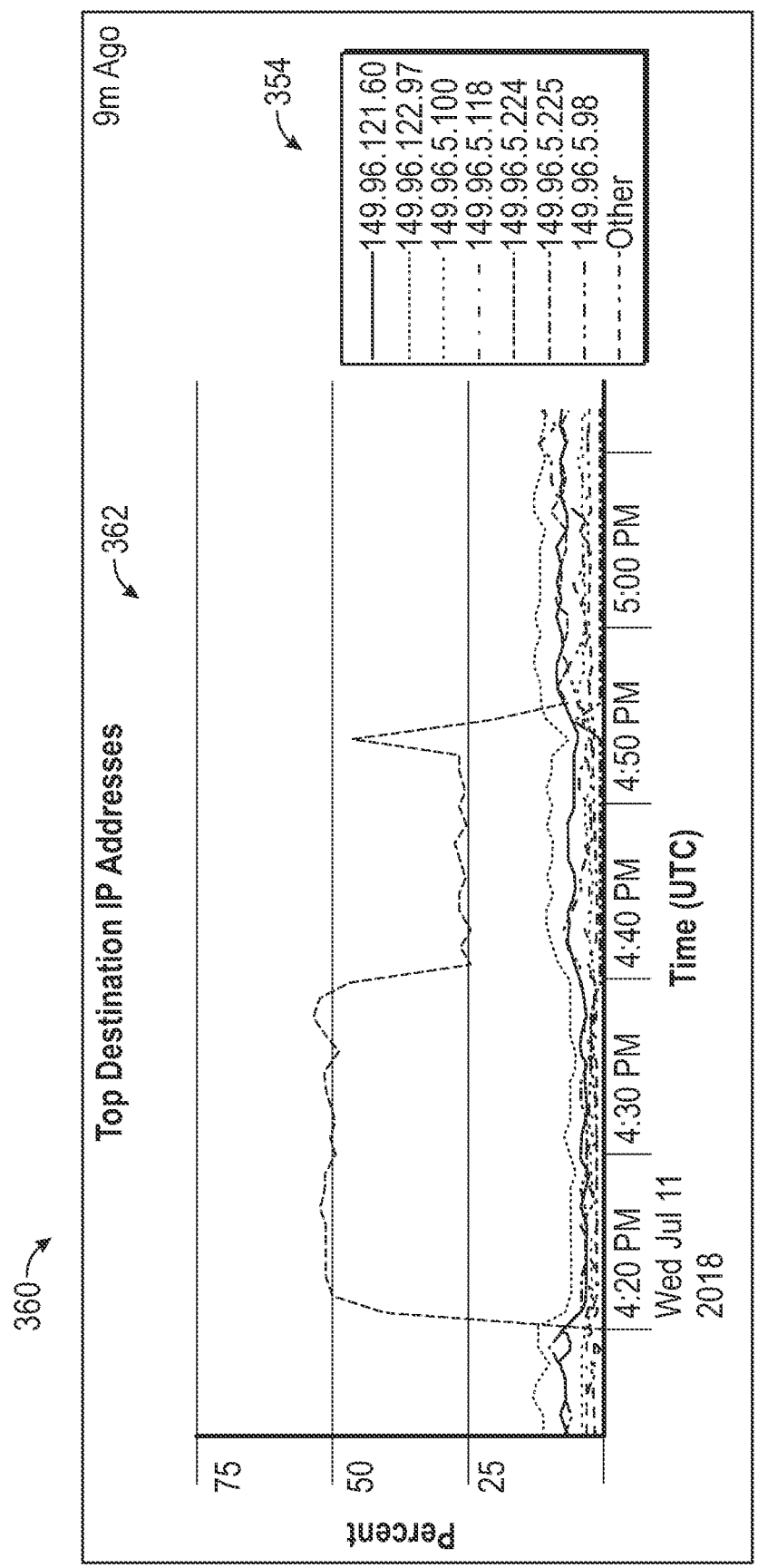
FIG. 5 is a timeline displaying a plot of success rates of TCP packet transmission from to a destination, in accordance with an embodiment.

Turning now to FIG. 5, an additional embodiment of a timeline 360 (which may be displayed as a user interface or portion of a user interface) that may be generated based at least in part on information included in a retransmission request TCP packet is shown. More specifically, while the timeline 350 illustrates information associated with communication from a source, the timeline 360 illustrates information associated with communication to a destination, such as a destination network (e.g., client network 12, network 14, the network hosting the platform 16, and/or the like) and/or computing system 200 in the cloud computing system 10. Thus, as described above with respect to the timeline 350, the timeline 360 may include a plot 362 that illustrates a number and/or a percentage of TCP packets sent to the destination that were dropped and/or requested to be re-transmitted. To that end, the analysis engine may use fields, such as the selective acknowledgement signal, an identifier 354 associated with a destination, TCP setup data fields, TCP teardown data fields, and/or the like to generate the plot 362.

Figure 6:
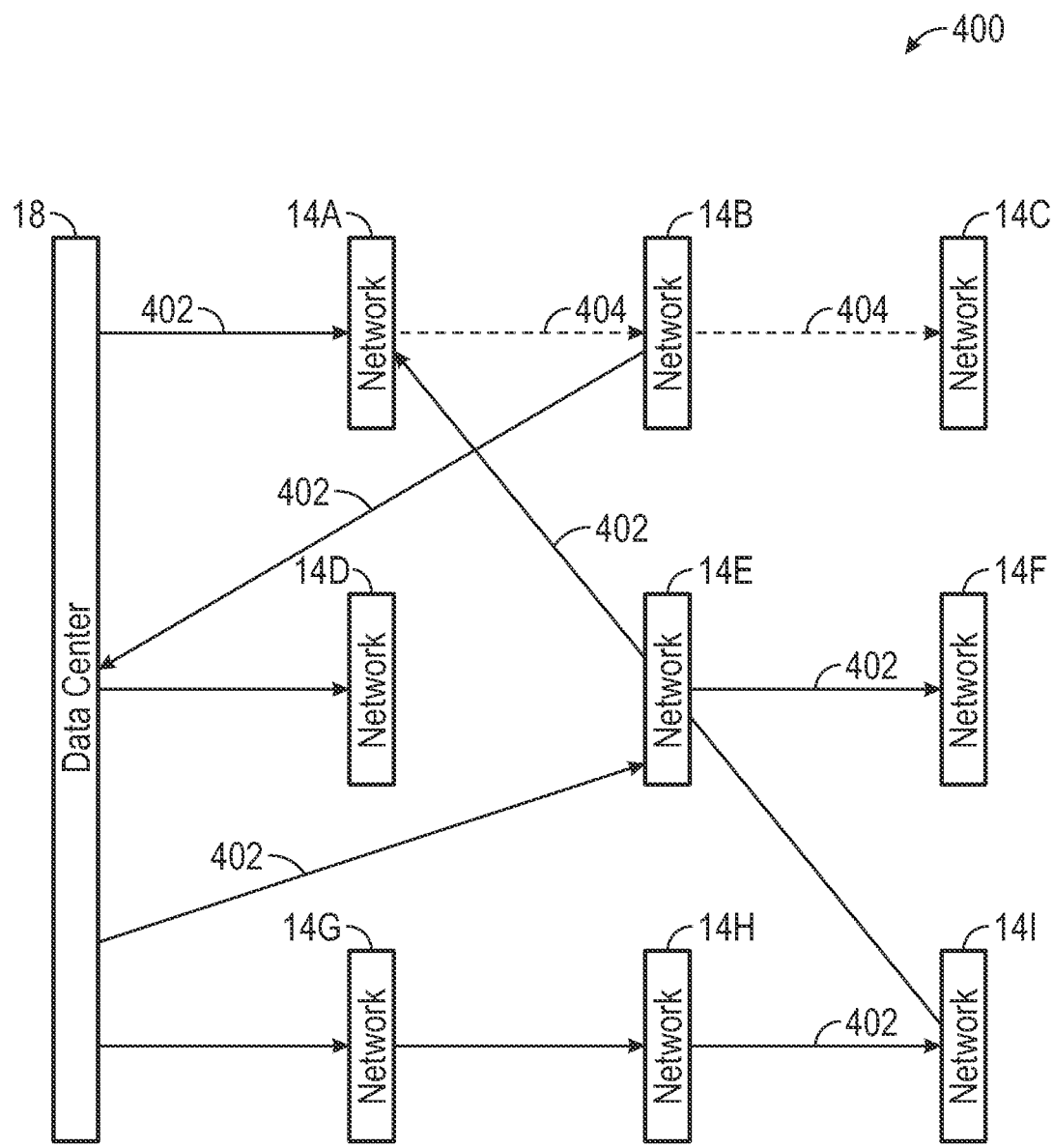
FIG. 6 depicts data communication traffic in a cloud architecture, in accordance with an embodiment.

Moreover, in some embodiments, data communication traffic in the topology (e.g., network topology) of the cloud computing system 10 and/or the data communication pathways of the cloud computing system 10 may be represented (as shown in block diagram 400 of FIG. 6) based at least in part on the retransmission request TCP packets. More specifically, in some embodiments a visual representation (which may be displayed as a user interface or portion of a user interface) may be provided or displayed of a location a TCP packet was successfully transmitted or dropped in the cloud computing system 10, such as via a representation as shown in FIG. 6 or other suitable communication flow representations. Additionally, the direction the TCP packet was travelling through the cloud computing system 10 when it was successfully transmitted or dropped may be incorporated or illustrated in such representations. Accordingly and as described in greater detail below, such a representation may also highlight common locations in the cloud computing system 10 where a TCP packet transmitted in a certain direction has been dropped.

In some embodiments, for example, a visual representation 400 may be provided that includes visual representations of the data centers 18 and/or the network hosting the platform 16 and networks 14 (e.g., 14A, 14B, 14C, 14D, 14E, 14F, 14H, 14I). In the illustrated embodiment, each of the networks 14 (e.g., 14A, 14B, 14C, 14D, 14E, 14F, 14H, 14I) may represent a network hosted by a different respective service provider. Additionally or alternatively, the visual representation 400 may depict the client network 12, a client device 20, the MID server 24, the edge device 22, and/or the like. Further, the visual representation 400 may depict data communication (e.g., data traffic), which may be represented with arrows 402 and dashed arrows 404, among other representations. In some embodiments, the arrows 402 may represent successful data communication, while the dashed arrows 404 may represent one or more dropped TCP packets. Further, as shown in the illustrated embodiment, the arrows 402 and dashed arrows 404 may include a respective directionality that corresponds to the directionality of the respective data communication represented by the arrows 402 or dashed arrows 404. For instance, an arrow 402 pointing from a first network 14A to a second network 14B may represent data communication from the first network 14A (e.g., a source) to the second network 14B (e.g., a destination).

To generate such a visual representation 400, information associated with the network topology of the cloud computing system 10 may be overlaid with information from the TCP packets transmitted in the cloud computing system 10. That is, for example, based in part on the network topology, the visual representation 400 may be populated with the representations of the data centers 18 and the networks 14 (e.g., 14A, 14B, 14C, 14D, 14E, 14F, 14H, 14I). Further, based at least in part on information from the TCP packets, the location and the directionality of the arrows 402 and the dashed arrows 404 in the visual representation 400 may be determined. For example, as described above, the TCP setup data fields and/or TCP teardown data fields may be used to determine the source (e.g., source network 14 and/or source computing system 200) and/or destination (e.g., destination network 14 and/or destination computing system 200) associated with a TCP packet, which may indicate the directionality of an arrow 402 and/or a dashed arrow 404.

Further, identification of a retransmission request TCP packet may indicate that a TCP packet associated with the retransmission request TCP packet was dropped. That is, for example, identification of a retransmission request TCP packet from a destination to a source may indicate that the TCP packet transmitted from the source to the destination was dropped. In such cases, a dashed arrow 404 may be used to represent the dropped TCP packet. Moreover, while the retransmission request TCP packet may be identified as having a first directionality (e.g., from the destination to the source), the dropped TCP packet may be represented with a dashed arrow 404 having a second directionality opposite from the first directionality (e.g., from the source to the destination).

Figure 7:
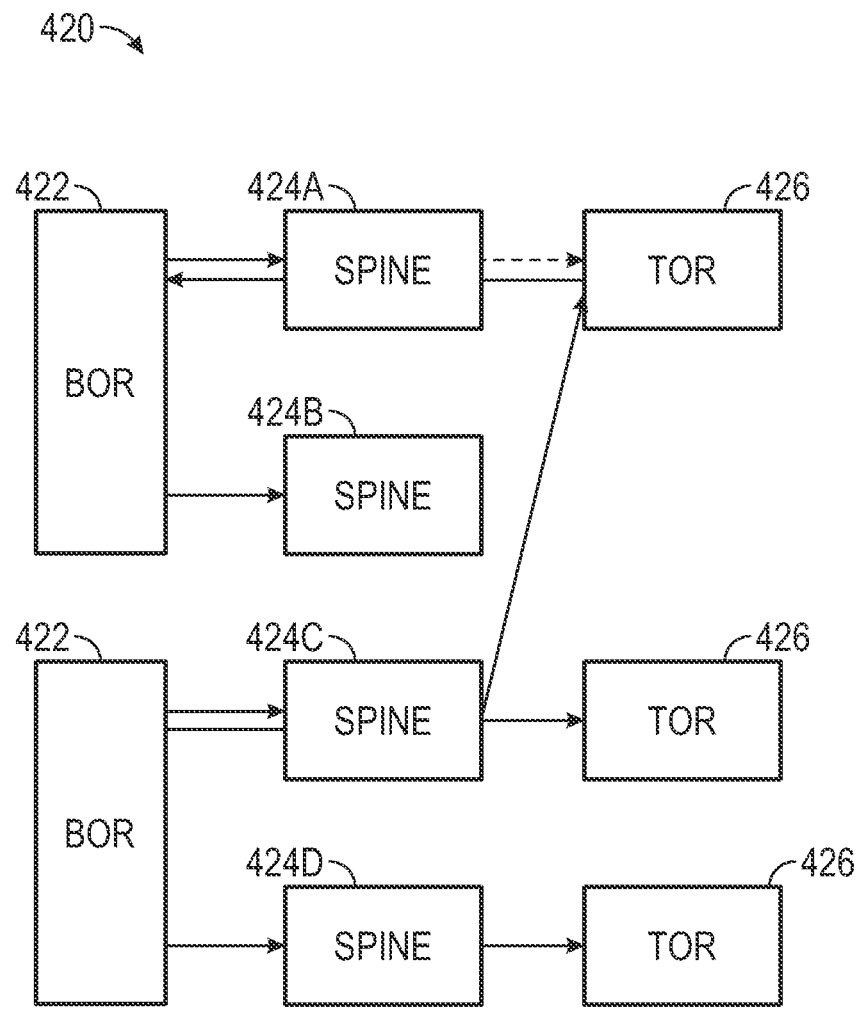
FIG. 7 further depicts data communication traffic in the cloud architecture, in accordance with an embodiment.

Additionally or alternatively, information related to a routing protocol, such as border gateway protocol autonomous path (BGP AS-path), used by the cloud computing system 10 may be overlaid with the information from the TCP packets. Thus, as illustrated in FIG. 7, a visual representation 420 (which may be displayed as a user interface or portion of a user interface) may display data communication traffic in the cloud computing system 10 using representations of border routers (BOR routers) 422, spines 424 (e.g., 424A, 424B, 424C, 424D), and top of rack (TOR) switches 426, and/or the like. Further, as described above with reference to the visual representation 400, the visual representation 420 may include indications, such as arrows 402 and dashed arrows 404, of the directionality and success of data communication between a source and a destination in the cloud computing system 10.

Further, based in part on the information from the retransmission request TCP packets, the BGP AS-path, the internal network topology, and/or the like, a history of the location and directionality (e.g., the source and/or the destination) of dropped TCP packets may be tracked. Using this history, peering decisions with networks 14 hosted by different service providers may be improved. For instance, in some embodiments, the first network 14A may be identified as a network 14 unsuitable for peering if the first network 14A has dropped a number of TCP packets above a threshold and/or has dropped a TCP packet within a certain time window (e.g., within the last 1 milliseconds (ms), 5 ms, 10 ms, and/or the like). On the other hand, a second network 14B that has dropped fewer TCP packets than the threshold and/or that has not dropped a TCP packet within the time window may be identified as suitable for peering. Accordingly, in some embodiments, the network hosting the platform 16 may be implemented to automatically select or update peering decisions based in part on the history of the location and directionality of dropped TCP packets. Additionally or alternatively, the visual representation 400 and/or the visual representation 420 may be implemented to highlight or provide a visual indicator specifying whether a network 14 is suitable for peering based in part on the history of the location and directionality of dropped TCP packets.

In some embodiments the history of the location and/or directionality of dropped TCP packets may be used to determine and/or predict the operational status of a particular device, such as a network device (e.g., router, virtual server 26, and/or the like), in the cloud computing system 10. For instance, by correlating the selective acknowledgment signal of TCP packets transmitted and/or received by the device to error messages produced by the device, spurious error messages or the spurious lack of error messages may be identified. Moreover, in response to identifying spurious error messages and/or the spurious lack of error messages, hardware degradation, software bugs, and/or the like affecting the device may be identified. Accordingly, in such embodiments, the operational status of the device may be determined and/or predicted regardless of whether the device itself communicated information regarding the operational status. Further, in some embodiments, the visual representation 400 and/or the visual representation 420 may be implemented to highlight or provide a visual indicator specifying the operational status of a network device based in part on the history of the location and directionality of dropped TCP packets.

Further, the analysis engine may be implemented to generate a notification based on information associated with retransmission request TCP packets. For example, the analysis engine may generate the notification to inform and/or update a user (e.g., a system administrator, a network engineer, a network device owner, and/or the like) regarding the success of data communication between a particular host and destination, recommended peering decision changes, the operational status of a network device, and/or the like. The generated notification may be sent to the user via, for example, a computing system 200. In such embodiments, the computing system 200 may provide an indication that the notification was received. The indication may be a ring tone, a vibration pattern, a visualization, a reminder, a task, an audio message, or the like. In some embodiments, the notification may activate an application or program stored on the computing system 200, despite the computing system 200 being in a sleep or low power mode, to increase the likelihood that a user will take note of the notification. Further, the notification may be sent via e-mail, text message, application notifications, and/or any other suitable messaging services platform. Moreover, in some embodiments, the notification may be provided via one or more of the user interfaces.

The specific embodiments described above have been shown by way of example, and it should be understood that these embodiments may be susceptible to various modifications and alternative forms. For example, while certain operations are described herein as being performed by an analysis engine, in some embodiments, any suitable set of computing systems 200 in the cloud computing system 10 may implement the operations described herein. Moreover, in some embodiments, any suitable combination of the user interfaces and/or graphical representations or constructs (e.g., 350, 360, 400, 420) described herein may be used. Further, while techniques described herein are applied within a cloud computing system 10, the techniques may be applied within any suitable network architecture. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U. S.C. 112(f).

What is claimed is:

1. A method, comprising:
    detecting an initial Transmission Control Protocol (TCP) packet of a sequence of TCP packets transmitted from a source to a destination in a communication network;
    detecting a retransmission request TCP packet transmitted from the destination to the source indicating a dropped TCP packet of the sequence of TCP packets during transmission of the sequence of TCP packets between the source and the destination, wherein the retransmission request TCP packet comprises a selective acknowledgement signal (SACK) in an enabled state indicating a gap in the sequence of TCP packets;
    in response to detecting the retransmission request TCP packet, storing information from one or more data fields of the initial TCP packet, one or more data fields of the retransmission request TCP packet, or a combination thereof;
    providing, via a user interface, an indication that the dropped TCP packet was dropped within a particular time window based on the stored information;
    detecting a duplicate retransmission request TCP packet transmitted from the destination to the source indicating the dropped TCP packet of the sequence of TCP packets during the transmission of the sequence of TCP packets between the source and the destination; and
    in response to detecting the duplicate retransmission request TCP packet, discarding the duplicate retransmission request TCP packet.

2. The method of claim 1, wherein, in response to receiving the retransmission request TCP packet the source retransmits the dropped TCP packet.

3. The method of claim 1, wherein network communication information is provided via the user interface, wherein the network communication information comprises a visual representation of a topology of the communication network, wherein the visual representation comprises a first representation corresponding to the source and a second representation corresponding to the destination.

4. The method of claim 3, wherein the network communication information comprises an additional indication of a number of dropped TCP packets during communication from the source, wherein updating the user interface comprises updating the additional indication to include the dropped TCP packet.

5. The method of claim 3, wherein the network communication information comprises an additional indication of a number of dropped TCP packets during communication to the destination, wherein updating the user interface comprises updating the additional indication to include the dropped TCP packet.

6. The method of claim 3, wherein the network communication information comprises an operational status of the source, wherein updating the user interface comprises updating the operational status of the source.

7. The method of claim 3, comprising updating the user interface by updating the visual representation of the topology of the communication network to indicate the dropped TCP packet was dropped during communication from the source to the destination.

8. The method of claim 1, comprising updating an internet peer link from a first network in the communication network to a second network in the communication network based at least in part on information from the retransmission request TCP packet.

9. The method of claim 1, wherein a plurality of dropped TCP packets in the sequence of TCP packets is dropped during the transmission of the sequence of TCP packets from the source to the destination wherein the plurality of dropped TCP packets comprises the dropped TCP packet.

10. The method of claim 9, wherein network communication information displayed on the user interface comprises a percentage of the plurality of dropped TCP packets determined by:
    determining a first number of TCP packets in the sequence of TCP packets;
    determining a second number of TCP packets in the plurality of dropped TCP packets; and
    updating the user interface displaying the percentage based at least in part on the first number and the second number.

11. The method of claim 1, wherein the source comprises a computing system in the communication network, a network in the communication network, or a combination thereof.

12. The method of claim 1, wherein the communication network comprises a cloud computing system.

13. A tangible, non-transitory, machine-readable medium, comprising machine-readable instructions that, when executed by one or more processors, cause the one or more processors to:
    detect an initial Transmission Control Protocol (TCP) packet of a sequence of TCP packets transmitted from a source to a destination in a communication network;
    detect a retransmission request TCP packet transmitted from the destination to the source indicating a dropped TCP packet of the sequence of TCP packets during transmission of the sequence of TCP packets between the source and the destination, wherein the retransmission request TCP packet comprises a selective acknowledgement signal (SACK) in an enabled state indicating a gap in the sequence of TCP packets;
    in response to detecting the retransmission request TCP packet, store information from one or more data fields of the initial TCP packet, one or more data fields of the retransmission request TCP packet, or a combination thereof;
    provide, via a user interface, an indication that the dropped TCP packet was dropped within a particular time window based on the stored information;
    detect a duplicate retransmission request TCP packet transmitted from the destination to the source indicating the dropped TCP packet of the sequence of TCP packets during the transmission of the sequence of TCP packets between the source and the destination; and
    in response to detecting the duplicate retransmission request TCP packet, discard the duplicate retransmission request TCP packet.

14. The tangible, non-transitory, machine-readable medium of claim 13, wherein, in response to receiving the retransmission request TCP packet, the source retransmits the dropped TCP packet.

15. The tangible, non-transitory, machine-readable medium of claim 13, comprising machine-readable instructions that, when executed by one or more processors, cause the one or more processors to:
    determine a number of dropped TCP packets associated with the destination exceeds a threshold number of dropped TCP packets based at least in part on the dropped TCP packet; and
    update the user interface to provide an additional indication that the number of dropped TCP packets associated with the destination exceeds the threshold number of dropped TCP packets.

16. A system, comprising:
a client instance hosted by a platform, wherein the client instance is accessible by one or more remote client networks, and wherein the system is configured to perform operations comprising:
- detecting an initial Transmission Control Protocol (TCP) packet of a sequence of TCP packets transmitted from a source to a destination in a communication network;
- detecting a retransmission request TCP packet transmitted from the destination to the source indicating a dropped TCP packet of the sequence of TCP packets during transmission of the sequence of TCP packets between the source and the destination, wherein the retransmission request TCP packet comprises a selective acknowledgement signal (SACK) in an enabled state indicating a gap in the sequence of TCP packets;
- in response to detecting the retransmission request TCP packet, storing information from one or more data fields of the initial TCP packet, one or more data fields of the retransmission request TCP packet, or a combination thereof;
- providing, via a user interface, an indication that the dropped TCP packet was dropped within a particular time window based on the stored information;
- detecting a duplicate retransmission request TCP packet transmitted from the destination to the source indicating the dropped TCP packet of the sequence of TCP packets during the transmission of the sequence of TCP packets between the source and the destination; and
- in response to detecting the duplicate retransmission request TCP packet, discarding the duplicate retransmission request TCP packet.

17. The system of claim 16, wherein the operations comprise transmitting a notification to the user interface based at least in part on the dropped TCP packet, wherein the notification comprises an additional indication of an operational status of the destination.

18. The system of claim 16, wherein the one or more data fields of the retransmission request TCP packet comprises a setup data field, a teardown data field, or a combination thereof.

19. The tangible, non-transitory, machine-readable medium of claim 13, wherein the source comprises a computing system in the communication network, a network in the communication network, or a combination thereof.

20. The system of claim 16, wherein the operations comprise retransmitting the dropped TCP packet from the source to the destination in response to receiving the retransmission request TCP packet.

* * * * *